US00RE48459E

(19) United States
(12) Reissued Patent
Lee et al.

(10) Patent Number: US RE48,459 E
(45) Date of Reissued Patent: Mar. 9, 2021

(54) LIGHTER AND CIGAR SPLITTER APPARATUS

(71) Applicant: EZ Splitz USA, Inc., Commerce, CA (US)

(72) Inventors: Young Jin Lee, Fullerton, CA (US); Young Min Lee, Fullerton, CA (US)

(73) Assignee: EZ SPLITZ USA, INC., Commerce, CA (US)

(21) Appl. No.: 16/388,452

(22) Filed: Apr. 18, 2019

Related U.S. Patent Documents

Reissue of:
(64) Patent No.: 10,028,530
Issued: Jul. 24, 2018
Appl. No.: 14/748,008
Filed: Jun. 23, 2015

U.S. Applications:
(63) Continuation of application No. 12/260,090, filed on Oct. 29, 2008, now Pat. No. 9,089,167.

(60) Provisional application No. 61/096,793, filed on Sep. 13, 2008.

(51) Int. Cl.
*A24F 13/24* (2006.01)
*A44B 15/00* (2006.01)

(52) U.S. Cl.
CPC ..... *A24F 13/24* (2013.01); *A44B 15/00* (2013.01)

(58) Field of Classification Search
CPC ..... A24F 13/24; A24F 13/26
USPC ..... 431/253; 131/253, 233, 252; 30/109, 30/111
See application file for complete search history.

(56) References Cited

U.S. PATENT DOCUMENTS 2,573,381 A 10/1951 Arnold
5,738,117 A * 4/1998 Fontaine, Jr. ..... A24F 13/26 131/249
5,888,061 A * 3/1999 Reynolds ..... A24F 13/24 131/249
5,913,676 A * 6/1999 Kim ..... A24F 13/26 131/249
5,934,894 A * 8/1999 Cigler ..... A24F 13/20 131/249
5,992,286 A 11/1999 Boole
6,151,781 A * 11/2000 Dehler ..... A24F 13/26 131/248
6,295,991 B1 * 10/2001 Emery ..... A24F 13/26 131/248
6,298,856 B1 * 10/2001 Park ..... A24F 13/26 131/248

(Continued)

*Primary Examiner* — Cary E Wehner
(74) *Attorney, Agent, or Firm* — Womble Bond Dickinson (US) LLP

(57) ABSTRACT

An apparatus for opening up the sheath of a cigar and lighting the cigar, comprising a lighter, comprising a lighter frame; and a cigar splitter attached to the base of the lighter frame by an outside surface of the cigar splitter. The cigar splitter comprises a housing having two open ends, an inside wall, and the outside surface, an axis parallel to the inside wall and passing through the two open ends, the two open ends permitting insertion of a cigar along the axis through one of the two open ends and to exit through another of the two open ends; a blade attached to the inside wall and oriented along the axis, the blade suitable for cutting an outer sheath of the cigar as the cigar is inserted through the cigar splitter along the axis; and a loop attached to the outside surface of the housing.

19 Claims, 15 Drawing Sheets

(56) References Cited

U.S. PATENT DOCUMENTS

| | | | | |
|---|---|---|---|---|
| 9,089,167 | B2 * | 7/2015 | Lee | A44B 15/00 |
| D805,247 | S * | 12/2017 | Nelson | D27/156 |
| D814,104 | S * | 3/2018 | Mahinfar | D27/161 |
| 2003/0062055 | A1 * | 4/2003 | Park | F23Q 2/32 131/249 |
| 2007/0051382 | A1 | 3/2007 | Alls | |
| 2008/0202535 | A1 | 8/2008 | Stokes et al. | A24F 13/24 131/249 |
| 2010/0269840 | A1 * | 10/2010 | Chuan | A24F 13/24 131/249 |
| 2012/0240949 | A1 * | 9/2012 | Spurling, III | A24F 13/24 131/253 |
| 2015/0096571 | A1 * | 4/2015 | Miano | A24F 15/18 131/250 |
| 2018/0007955 | A1 * | 1/2018 | Nelson | A24F 13/26 |

* cited by examiner

Fig. 9
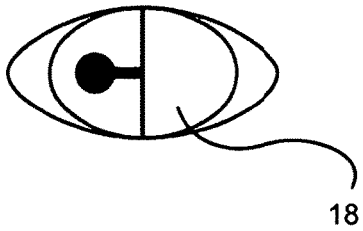
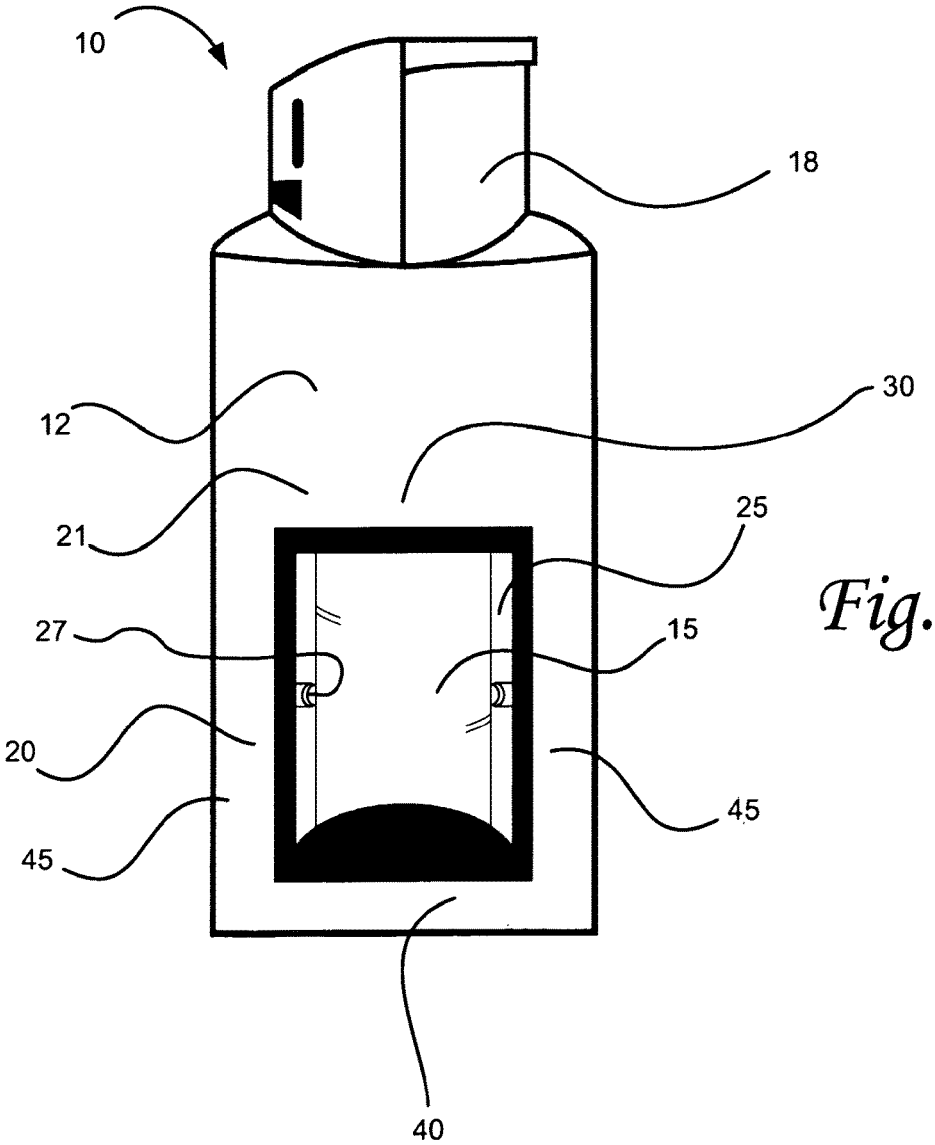
Fig. 10

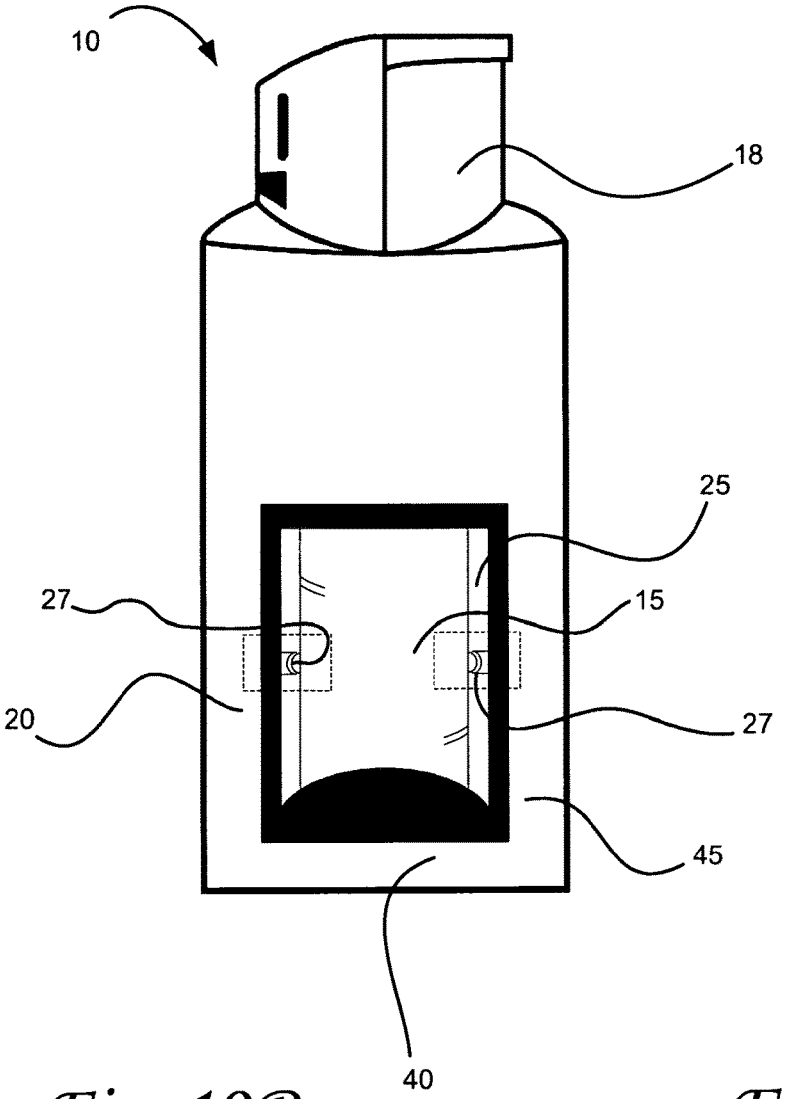
Fig. 10A
Fig. 10B
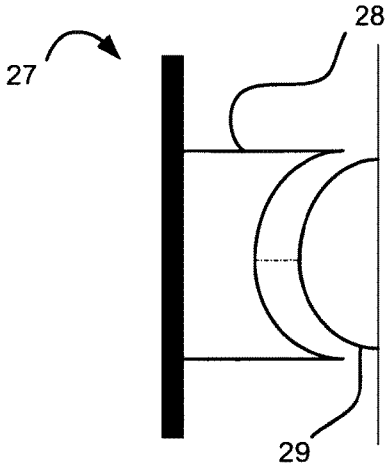
Fig. 10C
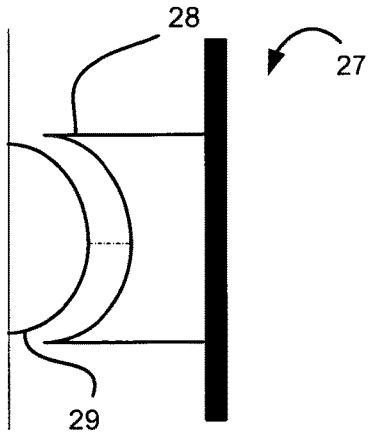

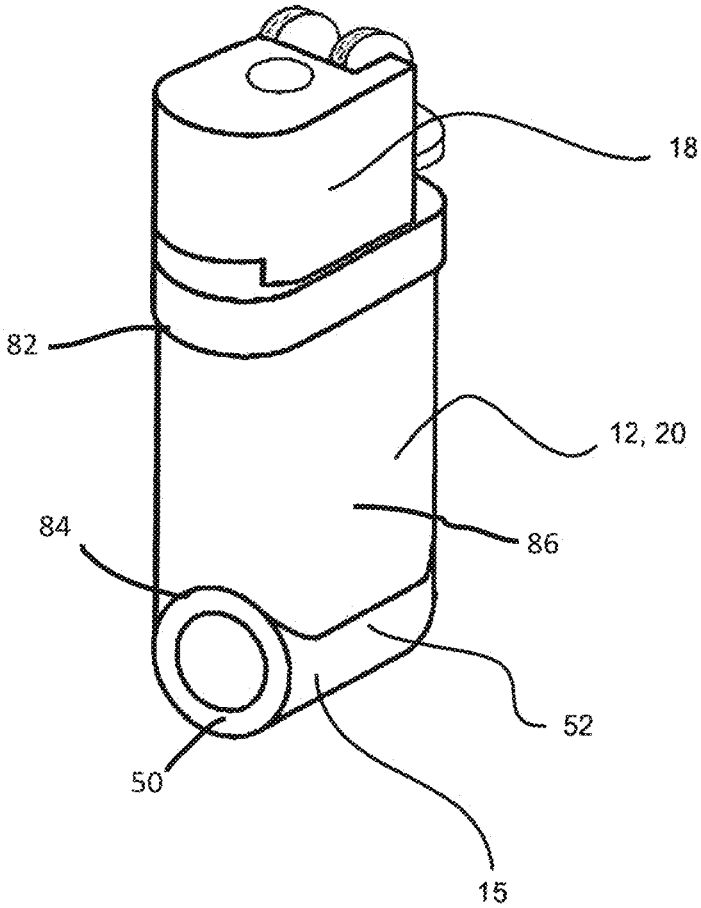
Fig. 23
AMENDED

NEW
FIG. 26
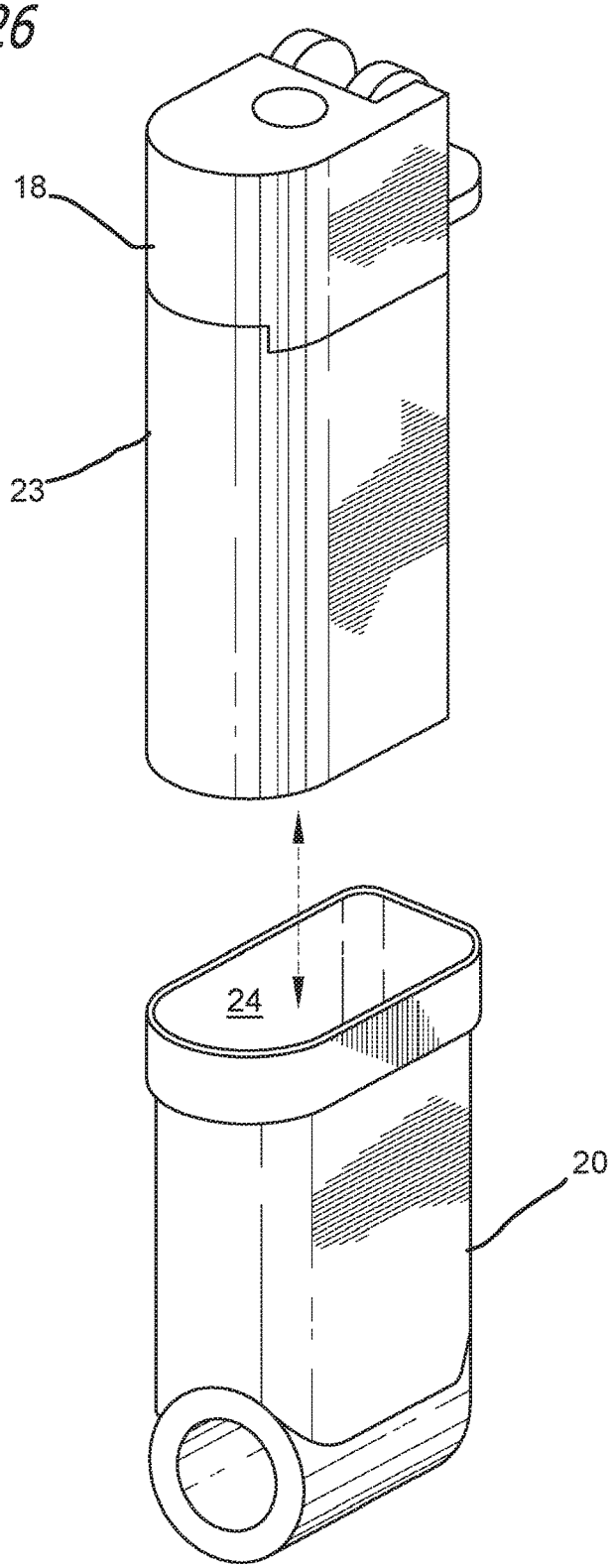

LIGHTER AND CIGAR SPLITTER APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATION INFORMATION

*This application is a reissue of U.S. application Ser. No. 14/748,008 filed Jun. 23, 2015, now U.S. Pat. No. 10,028, 530, issued Jul. 24, 2018.* This application claims priority from U.S. patent application Ser. No. 12/260,090, filed Oct. 29, 2008, now U.S. Pat. No. 9,089,167, issued Jul. 28, 2015, U.S. Provisional Application Ser. No. 61/096,793 filed Sep. 13, 2008, now expired, and U.S. Design application No. 29/323,049, now U.S. Pat. No. D597,250, issued Jul. 28, 2009, which are hereby incorporated herein in the respective entirety of each.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Technical Field

The present invention relates to cigar splitters, and more particularly, some embodiments relate to a lighter and cigar splitter apparatus.

Background of the Invention

The subject invention generally relates to a cigar splitter and a combination cigar splitter and lighter. Some users of cigars and other products for smoking find it advantageous and enjoyable to substitute the filling in premade cigars and smoke the cigar with the substituted filling. The present invention addresses this need by providing an apparatus for splitting cigars. The present invention also address the need to simplify the number of apparatuses for the enjoyment of substituting filling in cigars and smoking the substitute filled cigar by providing an apparatus for lighting and splitting the cigar.

BRIEF SUMMARY

According to one embodiment of the invention, a cigar splitter comprises a housing having two open ends, an inside wall, an outside surface, and a long axis. The open ends are in line with each other permitting a cigar to be inserted through one end and out the other. A is blade attached to the inside of the housing. The blade is oriented for cutting an outer sheath of the cigar as the cigar is inserted through one end of the splitter housing and out the other end.

In a variant of the cigar splitter, a cutting edge of the blade is oriented in a plane that contains the long axis of the housing, for cutting an outer sheath of a cigar as the cigar is inserted through one end of the splitter housing and out the other end.

In another variant of the cigar splitter, the blade comprises two cutting edges that meet to form a point between the two cutting edges. The cutting edges are disposed inside the housing away from the inside wall of the housing.

In a further variant of the cigar splitter, the housing comprises a hollow cylinder and the blade is disposed in the center along the length of the cylinder.

In still another variant, a keychain cigar splitter comprises the above described cigar splitter and includes a loop attached to the outside surface of the housing configured to receive a keychain.

In yet a further variant, a combination lighter cigar splitter is provided. The cigar splitter may be configured as described above.

In another variant, an apparatus for opening up the sheath of a cigar and lighting the cigar comprises: a lighter having lighter frame; and a cigar splitter attached to the lighter frame.

In a further variant, the apparatus may comprise a lighter head and a frame that has a channel configured to house the cigar splitter. The cigar splitter is disposed in the channel, and a cutting edge of the blade is oriented in a plane that contains the long axis of the housing, for cutting an outer sheath of a cigar as the cigar is inserted through one end of the splitter housing and out the other end.

In still another variant of the apparatus, the cigar splitter is rotatable within the channel of the lighter, and is rotatable between an active configuration and an inactive configuration. The inactive configuration comprises both open ends of the cigar splitter being obscured by the fame of the lighter. The active configuration comprises the cigar splitter rotated wherein the open ends are accessible for insertion of a cigar.

In yet a further variant of the apparatus, the blade comprises two cutting edges that meet to form a point between the two cutting edges. The cutting edges are disposed inside the housing away from the inside wall of the housing. The channel comprises a hole through the frame. and the frame further comprises a fuel reservoir that is disposed around the hole. The hole may be formed by an upper portion, left and right side portions and a bottom portion of the frame.

In another variant of the apparatus, the outside surface of the cigar splitter is configured to match the contour the lighter, defined by the upper, bottom, left and right portions of the frame, when the cigar splitter is in the locked orientation.

In a further variant, the apparatus has a locking mechanism for maintaining the cigar splitter in the inactive orientation.

In still another variant, a lighter comprises: a lighter head; and a frame configured to receive a cigar splitter.

In another variant of the lighter, the frame comprises a notch configured to receive the cigar splitter.

In a further variant of the lighter, the notch comprises a hole through the frame. The hole may be configured to rotatably house a cigar splitter having a housing with two open ends and blade disposed inside the housing and configured to cut a sheath of a cigar in a direction along the length of the cigar, perpendicular to a circumference of the cigar.

In still another variant, the lighter may include a safety mechanism for preventing access to a blade of a cigar splitter. In one embodiment, the safety mechanism comprises the frame having a configuration and countered surfaces configured to obscure both open ends of a cigar splitter having two open ends leading to a blade for producing a cut along the length of a cigar.

In yet a further variant of the lighter, the notch comprises a hole, and the lighter further comprises a cigar splitter. The cigar splitter is disposed in the in the hole, and the cigar splitter comprises: a housing having two open ends, an inside wall and outside surface, and a long axis. The open ends are in line with each other permitting a cigar to be inserted through one end and out the other. A blade is attached to the inside of the housing. The blade is oriented for cutting an outer sheath of a cigar as the cigar is inserted through one end of the splitter housing and out the other end. The cutting edge is oriented in a plane that contains the long axis of the housing, for cutting an outer sheath of a cigar as the cigar is inserted through one end of the splitter housing and out the other end.

In another variant, a method of making a lengthwise cut in a sheath of a cigar perpendicular to the circumference of the cigar, and lighting the cigar is provided. The method comprises: moving a cigar splitter out from a frame of a lighter to access an open end of the cigar splitter; inserting a cigar into the splitter and making a lengthwise cut in the sheath perpendicular to the circumference of the cigar; moving the cigar splitter into the frame of the lighter to obscure access to the open end of the cigar splitter; and turning the lighter on to produce a flame from the lighter.

In a variant of the method, moving the cigar splitter out from the frame of the lighter comprises rotating the cigar splitter out from the frame of the lighter to access the open end of the cigar splitter; and moving the cigar splitter into the frame of the lighter comprises rotating the cigar splitter into the frame of the lighter to obscure access of the open end of the cigar splitter.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 9 is a top view of an apparatus for lighting and splitting a cigar;

FIG. 10 is a front view of the apparatus for lighting and splitting a cigar;

FIG. 10A is view of the apparatus for lighting and splitting a cigar illustrating the mechanism for rotation;

FIG. 10B is a close up view of the apparatus for lighting and splitting a cigar illustrating the left mechanism for rotation;

FIG. 10C is a close up view of the apparatus for lighting and splitting a cigar illustrating the right mechanism for rotation;

FIG. 23 is a perspective view of another variant of the apparatus for lighting and splitting a cigar;

*FIG. 26 is an exploded perspective view showing a lighter with a lighter body separated from a lighter frame.*

Figure 1:
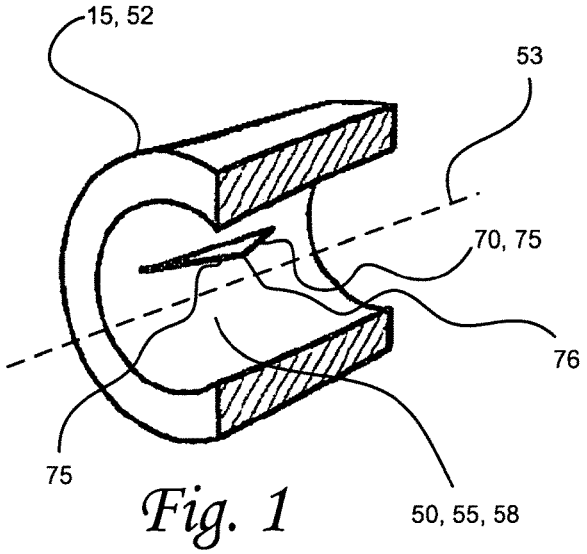
FIG. 1 is a cut away perspective view of a preferred cigar splitter in accordance with the principles of the invention.
Figure 2:
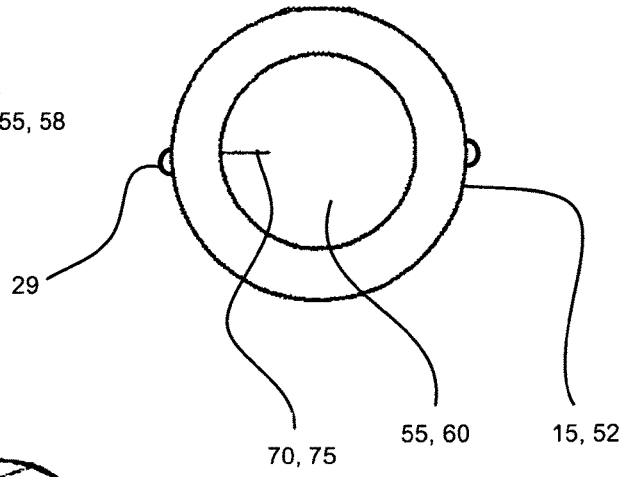
FIG. 2 is a front view of the cigar splitter.
Figure 3:
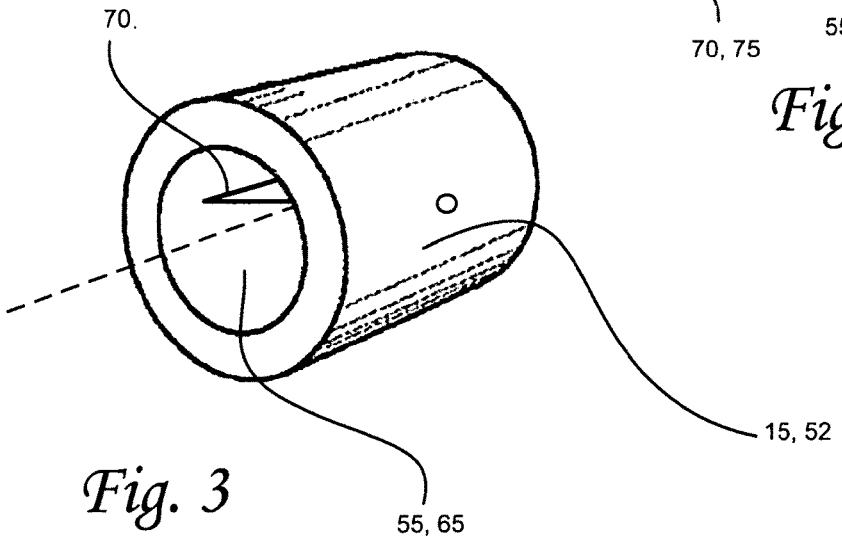
FIG. 3 is a perspective view of the cigar splitter.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

In one variant of the invention, referring to FIGS. 1-5, a cigar splitter 15 comprises a housing 50 having two open ends 60, 65, an inside wall 58, and outside surface 52, and a long axis 53, wherein the open ends 60, 65 are in line with each other permitting a cigar 8 to be inserted through one end 60, 65 and out the other 60, 65.

A blade 70 is attached to the inside [55] of the housing 50. The blade 70 is oriented for cutting an outer sheath 6 of the cigar 8 as the cigar 8 is inserted through one end 60, 65 of the splitter housing 50 and out the other end 60, 65. When the cigar 8 is inserted, a cut 4 can be made along the long axis 9 of the cigar 8, so that the cigar 8 can be split open and its filling 11 replaced.

Figure 1A:
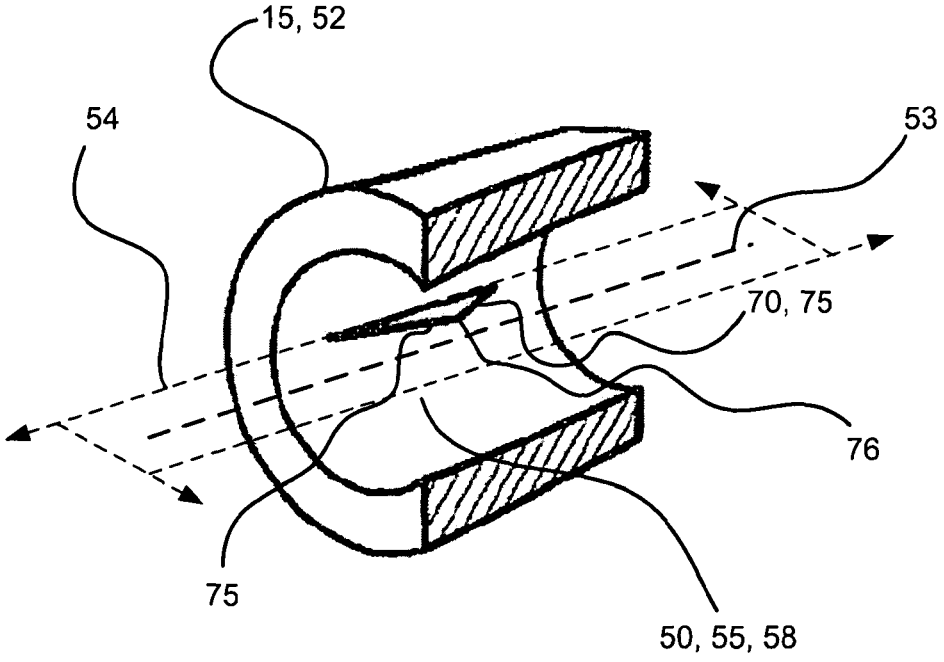
FIG. 1A is a cut away perspective view of the cigar splitter.

In another variant of the cigar splitter 15, referring to FIG. 1A, the cutting edge 75 is oriented in a plane 54 that contains the long axis 53 of the housing 50, for cutting an outer sheath [7] *6* of a cigar 8 as the cigar 8 is inserted through one end 60, 65 of the splitter housing 50 and out the other end 60, 65.

In a further variant of the cigar splitter 15, the blade comprises two cutting edges 75 edges disposed inside [55] the housing 50 away from the inside wall 58 of the housing 50. The cutting edges 75 meet to form a point 76 between the two cutting edges 75.

In still another variant of the cigar splitter, the housing 50 comprises a hollow cylinder and the blade 70 is disposed in the center along the length of the cylinder. The length of the cylinder is generally parallel to that of the long axis 53.

Figure 6:
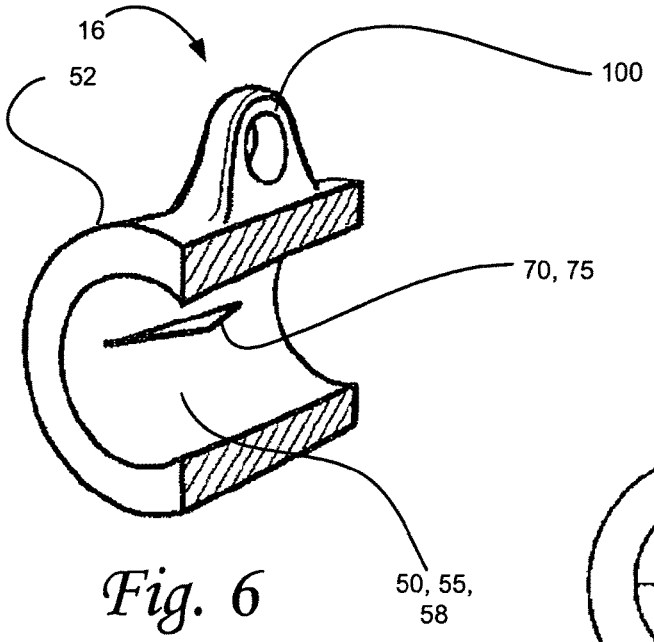
FIG. 6 is a cut away perspective view of a keychain cigar splitter.
Figure 7:
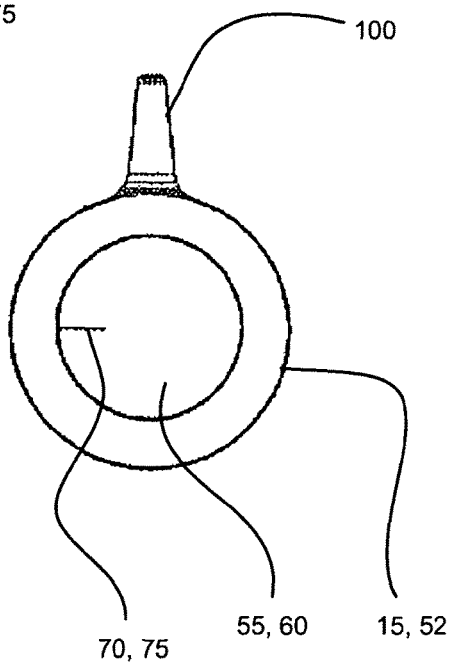
FIG. 7 is a front view of the keychain cigar splitter.
Figure 8:
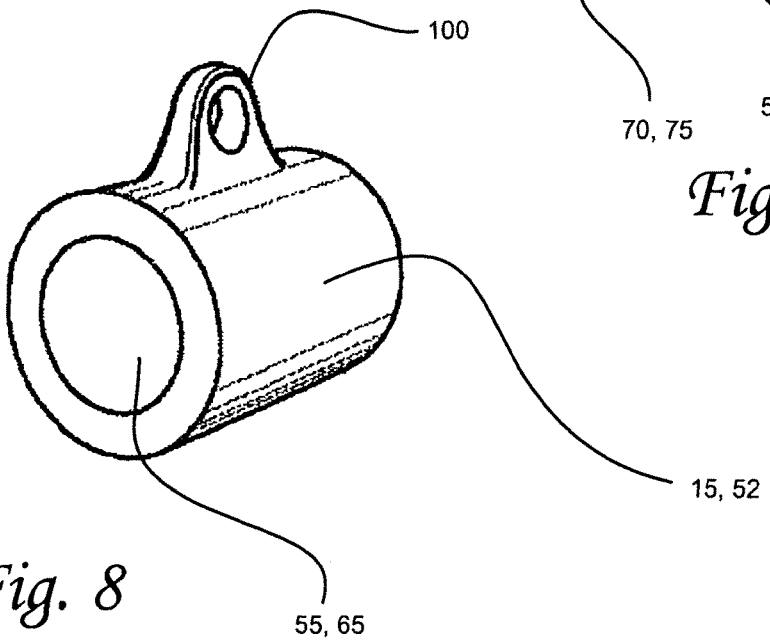
FIG. 8 is a perspective view of the keychain cigar splitter.

In yet a further variant, referring to FIGS. 6-8, a keychain cigar splitter 16 is provided. The keychain cigar splitter 16 may comprises the same general features as described above and may further include a loop or through hole 100 attached to the outside surface 52 of the housing 50 and is configured to receive a keychain.

In another variant, referring to FIGS. 9-12, a combination lighter cigar splitter is provided. The cigar splitter 15 may be as described above and in FIGS. 1-5, comprising a housing 50, and a blade 70 configured so that when a cigar 8 is inserted, a cut 4 can be made along the long axis 9 of the cigar 8, and the cigar 8 can be split open and its filling 11 replaced.

In a further variant, an apparatus 10 for opening up the sheath 6 of a cigar 8 and lighting the cigar 8, comprises a lighter 12 having a lighter frame 20 and a cigar splitter 15 attached to the lighter frame 20.

In still another variant, the apparatus 10 may comprise a lighter head 18 and a frame 20 comprising a [channel] *notch* 25 configured to house the cigar splitter [25] *15*. The cigar splitter 15 is disposed in the [channel] *notch* 25. Referring to FIG. 1A, a cutting edge 75 is oriented in a plane 54 that contains the long axis 53 of the housing 50, for cutting an outer sheath [7] *6* of a cigar 8 as the cigar 8 is inserted through one end 60, 65 of the splitter housing 50 and out the other end 60, 65.

Figure 13:
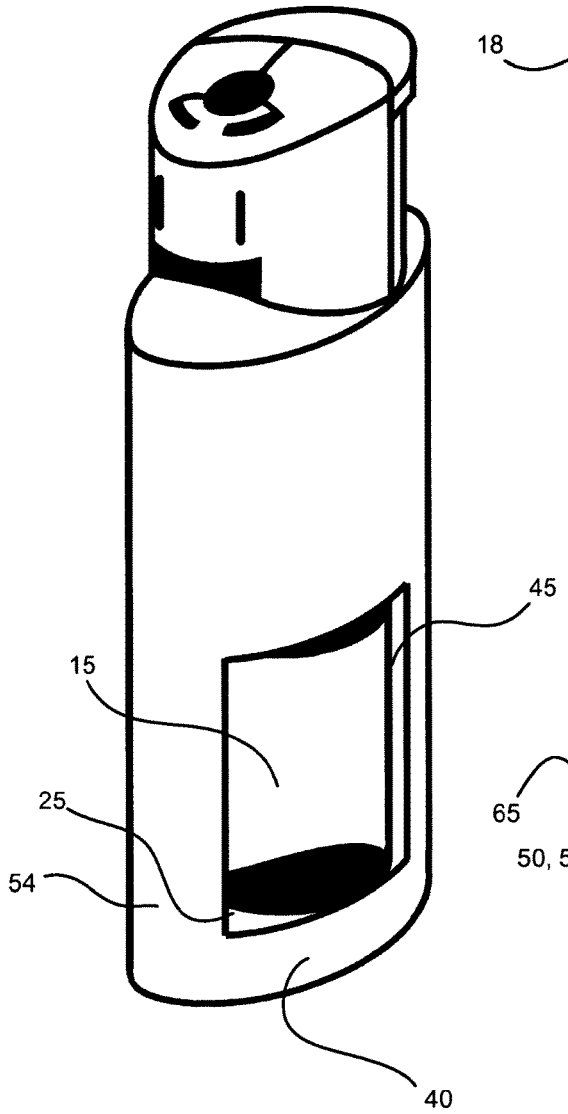
FIG. 13 is a perspective view of the apparatus for lighting and splitting a cigar in an inactive configuration.
Figure 14:
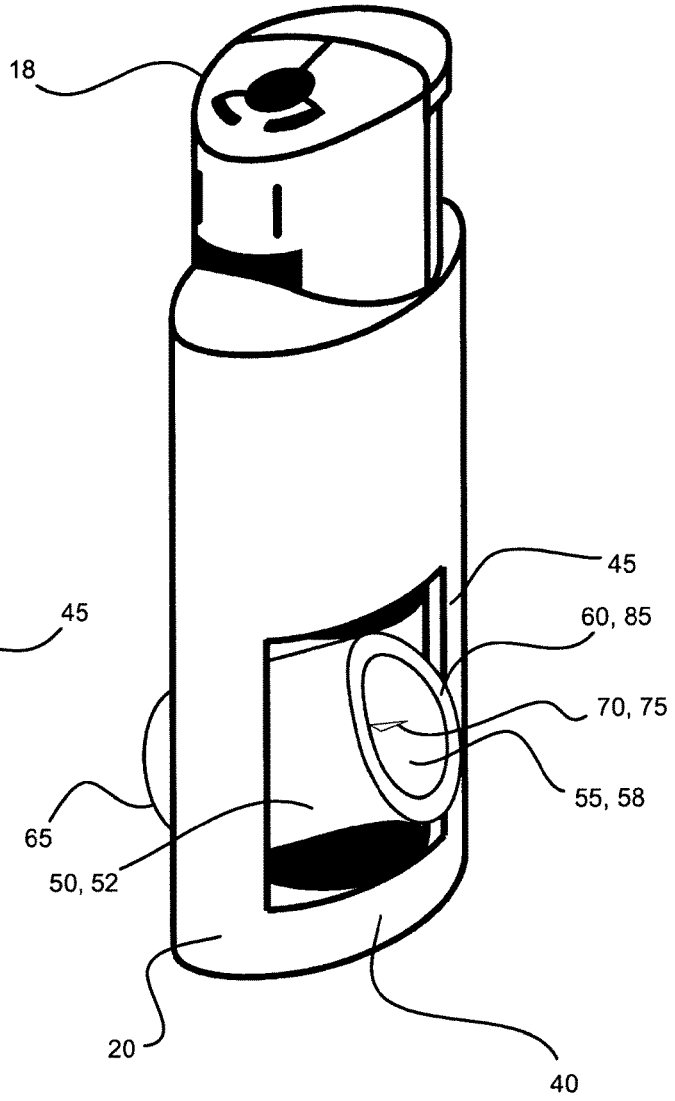
FIG. 14 is a perspective view of the apparatus for lighting and splitting a cigar in an active configuration.
Figure 15:
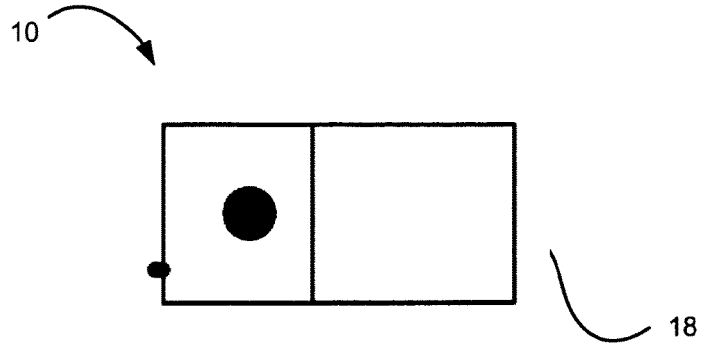
FIG. 15 is a top view of an alternative embodiment of an apparatus for lighting and splitting a cigar.
Figure 17:
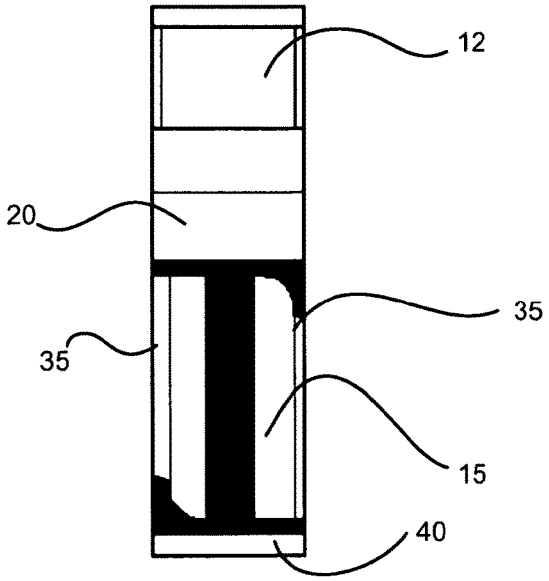
FIG. 17 is a side view of an alternative embodiment of the apparatus for lighting and splitting a cigar in an inactive configuration.
Figure 18:
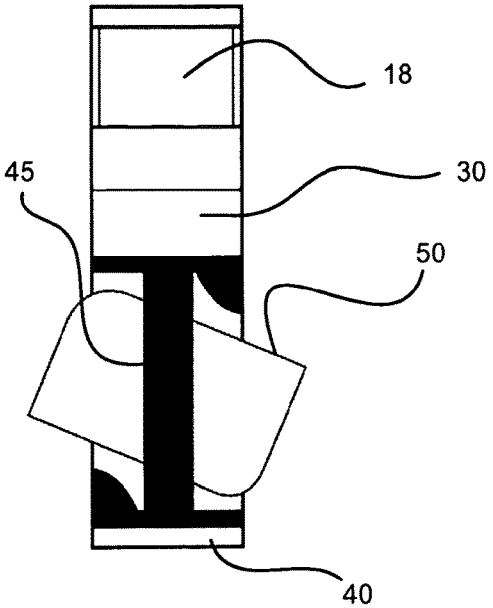
FIG. 18 is a side view of an alternative embodiment of the apparatus for lighting and splitting a cigar in an active configuration.

In yet a further variant of the apparatus 10, the cigar splitter 15 is rotatable within the [channel] *notch* 25 of the lighter 12. The rotatable connection 27 between the splitter 15 and the lighter 12 may be by any suitable means. In one embodiment, referring to FIGS. 10A-C, the rotatable connection 27 may be via a ball 29 located on the splitter 15 and a corresponding socket 28 located on the frame 20 of the lighter 12 or vice versa. The splitter 15 is rotatable between an active configuration, illustrated in FIGS. 10, 11 and 13, and an inactive configuration, illustrated in FIGS. 12 and 14. The inactive configuration comprises both open ends 60, 65 of the cigar splitter 15 being obscured by the frame 20 of the lighter 12. The active configuration comprises the cigar splitter 15 rotated wherein the open ends 60, 65 are accessible for insertion of a cigar 8.

In still a further variant of the apparatus, the [channel] *notch* 25 comprises a hole [25] through the frame 20. The frame has a fuel reservoir 21, wherein the fuel reservoir 21 is disposed around the hole [25]. The hole may *be* formed by an upper portion 30, left and right side portions 45 and a bottom portion 40 of the frame 20.

In another variant of the apparatus, the outside surface [55] of the cigar splitter 15 is configured to match the contour the lighter 12, defined by the upper 30, bottom 40, left 45 and right 45 portions of the frame 20, when the cigar splitter 15 is in the locked orientation.

Figure 12:
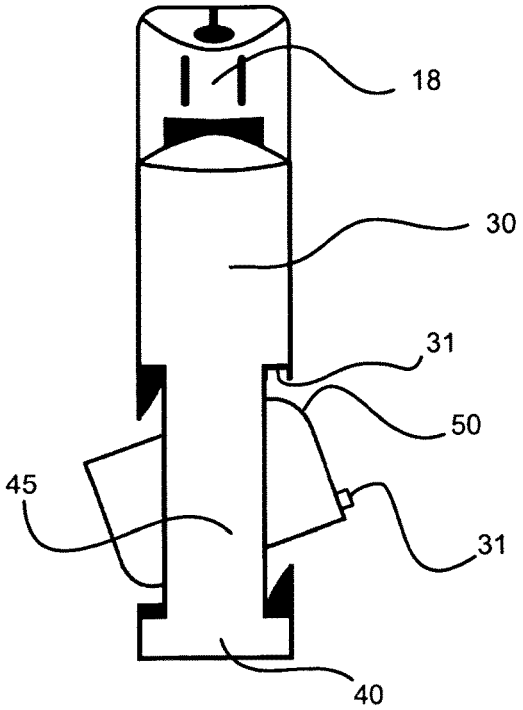
FIG. 12 is a side view of the apparatus for lighting and splitting a cigar in an active configuration.
Figure 10D:
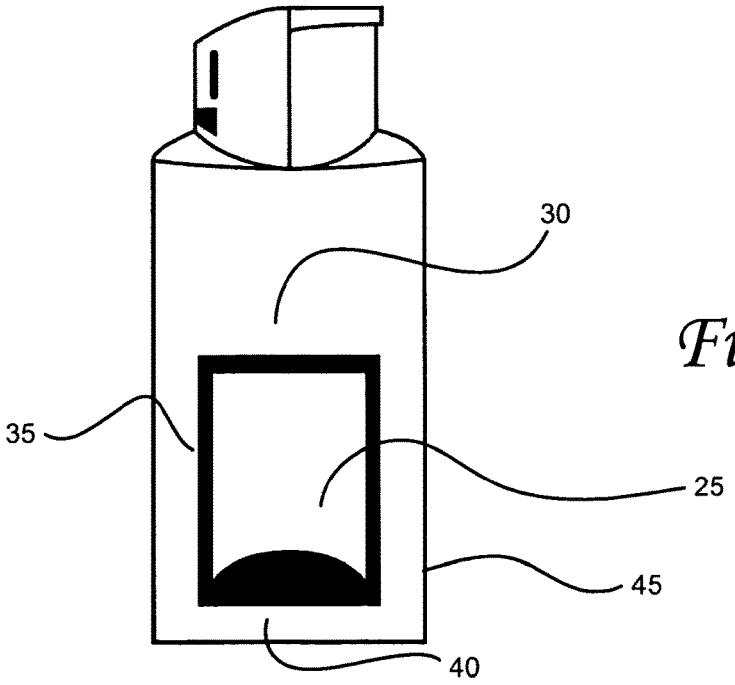
FIG. 10D is a front view of the apparatus for lighting and splitting a cigar illustrating the channel in the lighter.

In a further variant of the apparatus, referring to FIG. 12, the apparatus 10 may include a locking mechanism 31 for maintaining the cigar splitter in the inactive orientation. The locking mechanism 31 may be, for example, a detent or a dimple and corresponding peg. The locked orientation serves to protect a user from accidentally injuring themselves on the blade 70. In the active orientation, the top 60 and bottom 65 openings are accessible for inserting a cigar 8 for splitting the cigar 8 open along a long axis 9 of the cigar 8, with the blade 70.

In still another variant, a lighter 12 comprises a lighter head 18 and a frame 20 configured to receive a cigar splitter 15.

In a variant of the lighter 12, the frame 20 comprises a notch 25 configured to receive the cigar splitter 15.

Figure 4:
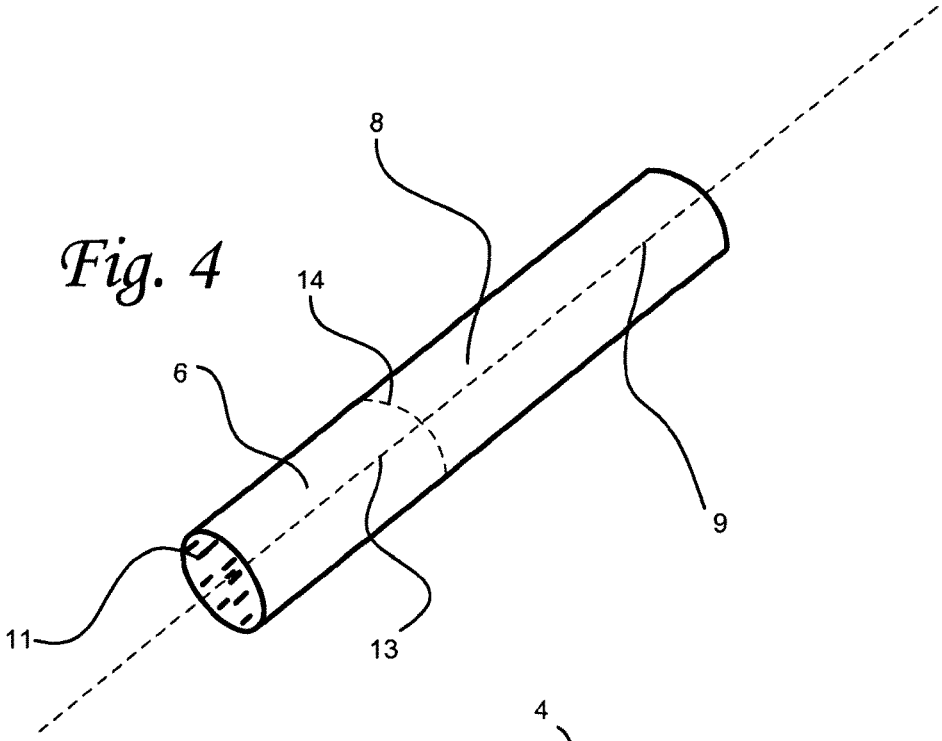
FIG. 4 is a perspective view of a cigar.
Figure 5:
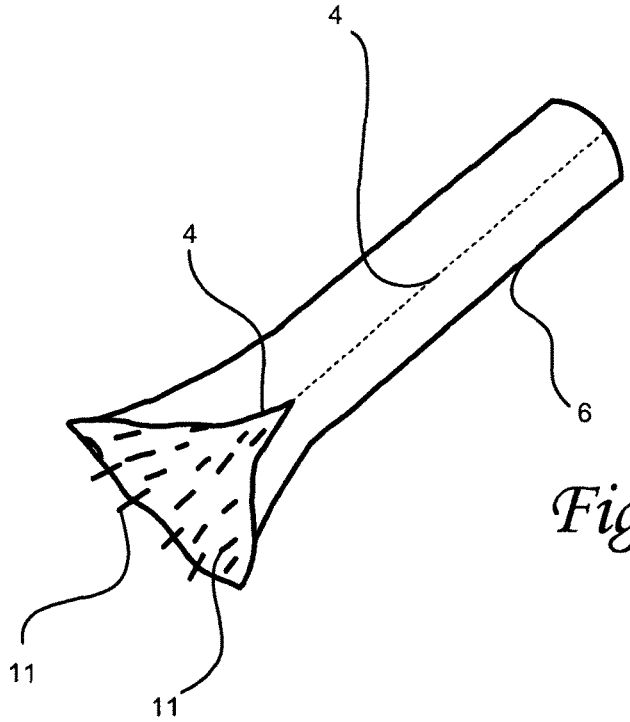
FIG. 5 is a perspective view of a cigar split by the cigar splitter.

In another variant of the lighter 12, the notch 25 comprises a hole [25] through the frame 20. The hole [25] is configured to rotatably house a cigar splitter 15 having a housing 50 with two open ends 60, 65. A blade 70 disposed inside the housing 50 and, referring to FIGS. 4-5, is configured to cut a sheath 6 of a cigar 8 in a direction along the length 13 of the cigar 8, perpendicular to a circumference 14 of the cigar.

In a further variant, the lighter 12 is configured to inherently have a safety mechanism for preventing access to a blade of a cigar splitter. The safety mechanism may comprises the frame 20 structured and having countered surfaces configured to obscure both open ends 60, 65 of a cigar splitter 15 having two open ends 60, 65 leading to a blade 70 for producing a cut 4 along the length 13 of a cigar 8.

In still another variant of the lighter, the notch 25 comprises a hole [25], and the lighter 12 further comprises a cigar splitter 15. The cigar splitter is disposed in the in the hole [25] and may be as generally described above and in FIGS. 1-5.

Figure 16:
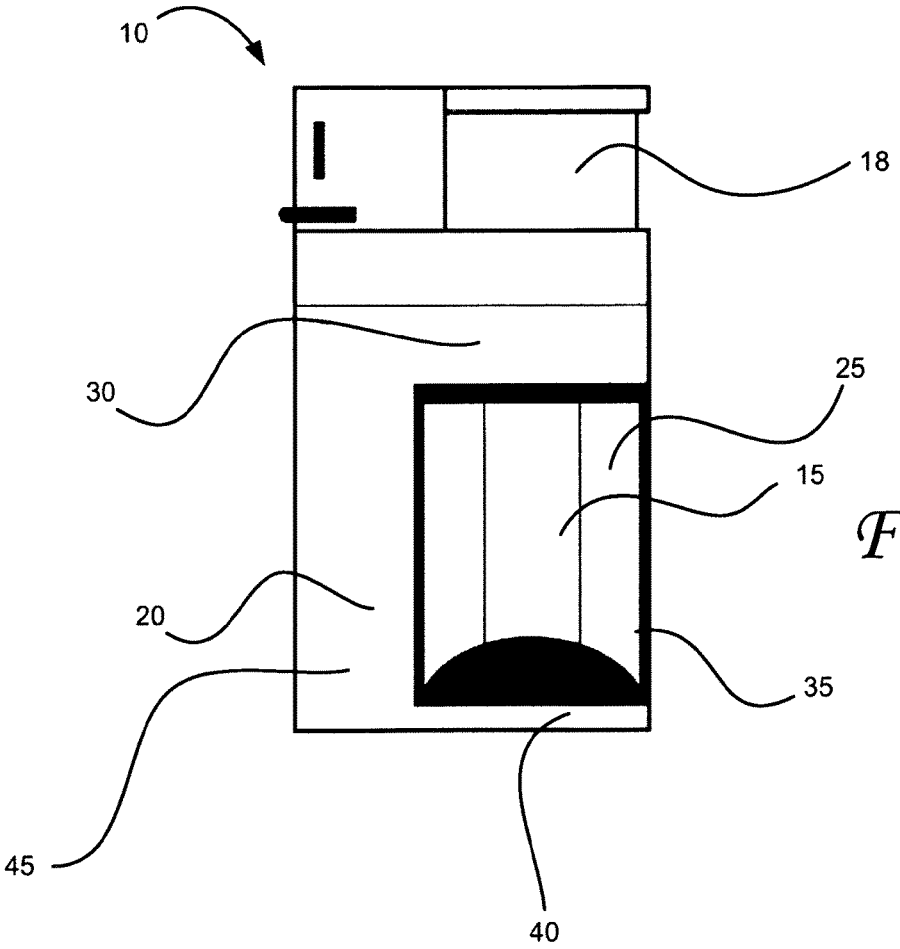
FIG. 16 is a front view of an alternative embodiment of the apparatus for lighting and splitting a cigar.
Figure 16A:
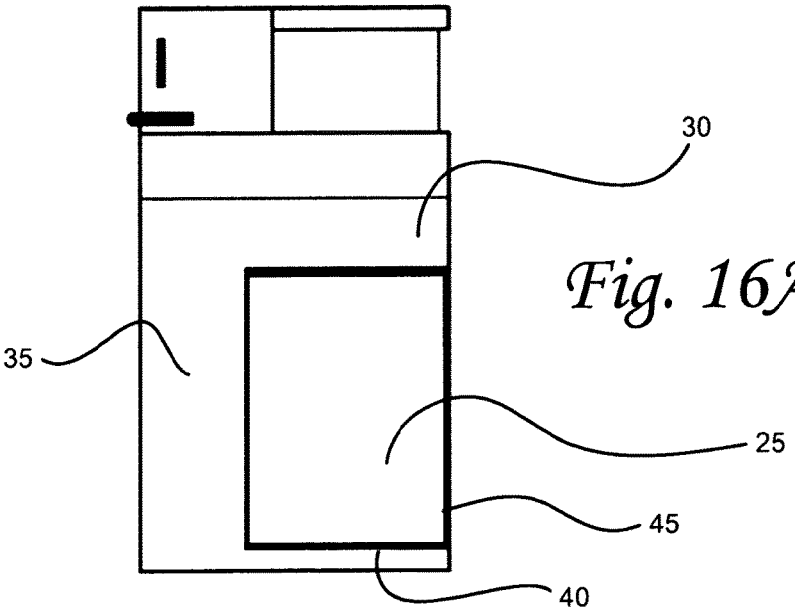
FIG. 16A is front view of an alternative embodiment of the apparatus for lighting and splitting a cigar illustrating the channel in the lighter.
Figure 19:
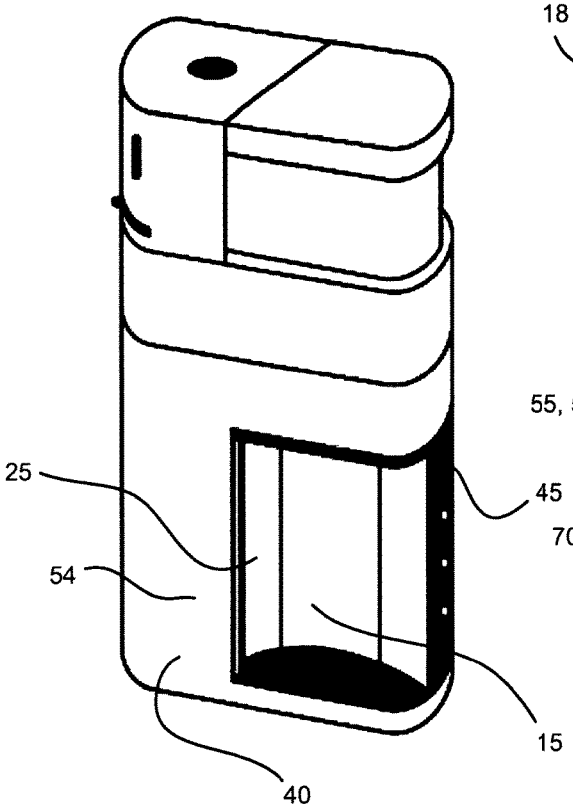
FIG. 19 is a perspective view of an alternative embodiment of the apparatus for lighting and splitting a cigar in an inactive configuration.
Figure 20:
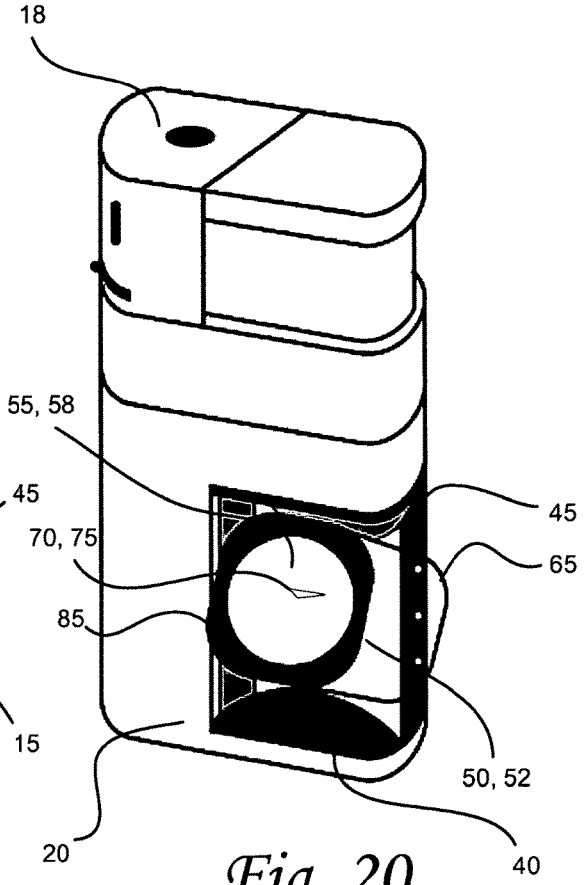
FIG. 20 is a perspective view of an alternative embodiment of the apparatus for lighting and splitting a cigar in an active configuration.

In yet a further variant, referring to FIGS. 15-20, a lighter cigar splitter apparatus 10 comprises a lighter 12 and a cigar splitter 15. The lighter has a lighter head 18 and a frame 20 comprising a rectangular notch 25. Referring to FIG. 16A, the notch 25 is surrounded by an upper portion 30, a side portion 35 and a bottom portion 40 of the frame. A side member 45 is connected between the upper portion 30 and the bottom portion 40. In another embodiment, the notch comprises a hole [25] through the frame 20 of the lighter and the side member 45 is integral with the frame 20.

The cigar splitter 15 is disposed inside the notch 25 and in one embodiment, comprises a hollow rectangular housing 50 having a passageway 55 configured to receive a cigar. The housing 50 has a top opening 60 and a bottom opening 65 that permit access to the passageway 55. A blade 70 is disposed on the [passageway] *inside* wall 58 and has a knife edge 75 oriented parallel to the axis of the housing 50. The housing 50 of the cigar splitter is connected between the side portion 35 and the side member 45 of the frame [15] *20*, and the cigar splitter 15 is rotatable between the side portion 35 and the side member 45 of the frame [15] *20*. The cigar splitter 15 is configured to rotate between a locked orientation, for example shown in FIGS. 17 and 19, and an active orientation, for example shown in FIGS. 18 and 20.

In the locked orientation, the cigar splitter housing's outside walls 52 are parallel to the wall [54] *56* of the lighter and the top 60 and bottom 65 opening are inaccessible to a user as they are obscured by the frame of the lighter 12. A suitable locking mechanism may be incorporated into the apparatus 10 for maintaining the locked orientation. The locking mechanism may be, for example, a detent or a dimple and corresponding peg. The locked orientation serves to protect a user from accidentally injuring themselves on the blade 70. In the active orientation, the top 60 and bottom 65 openings are accessible for inserting a cigar 8 for splitting the cigar open along a long axis 9 of the cigar, with the blade 70.

Figure 21:
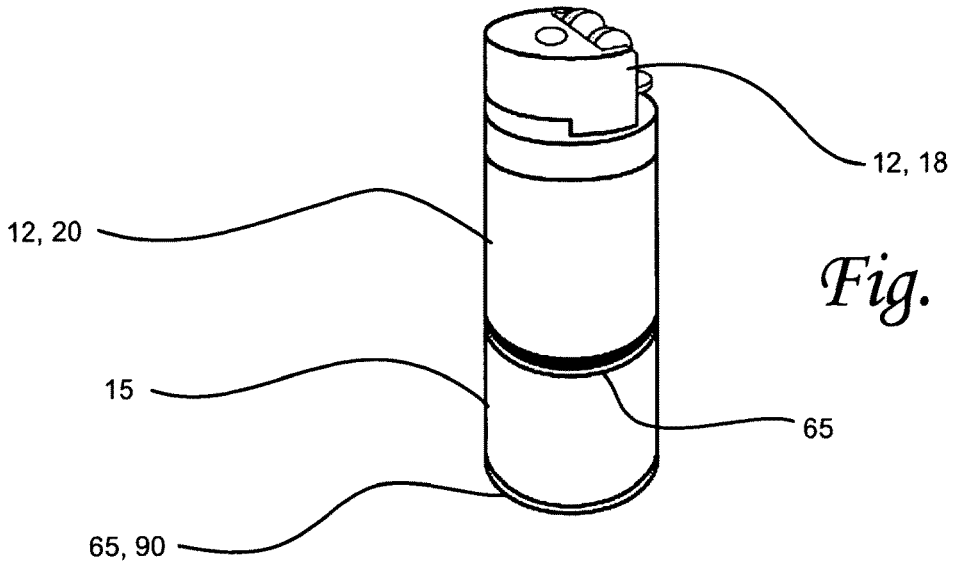
FIG. 21 is a perspective view of a variant of the apparatus for lighting and splitting a cigar in an inactive configuration.
Figure 22:
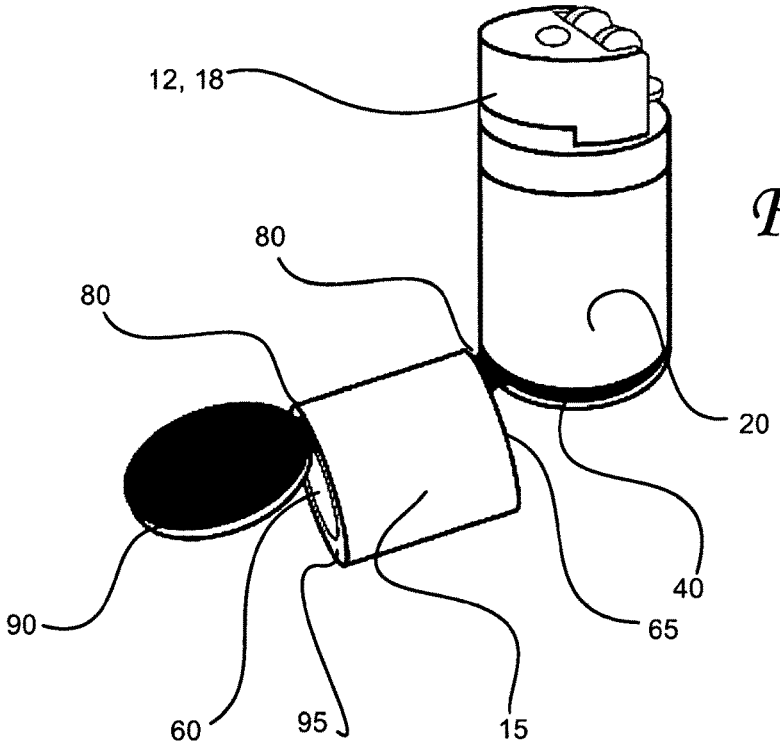
FIG. 22 is a perspective view of a variant of the apparatus for lighting and splitting a cigar in an active configuration.

In another variant of the lighter cigar splitter apparatus 10, referring to FIGS. 21 and 22, a lighter 12 and a cigar splitter 15. The lighter has a lighter head 18 and a frame 20. The cigar splitter 15 is disposed below the lighter frame 20 and connected to the frame 20 by a hinge 80. The cigar splitter comprises a hollow housing 50 formed in the same shape as the lighter frame [15] *20* so as to form a single continuous shape. In the example shown in FIGS. 21 and 22, the shape is a cylindrical shape. Other shapes are contemplated, such as rectangular solid shapes or rectangular solid shapes with rounded comers.

Figure 11:
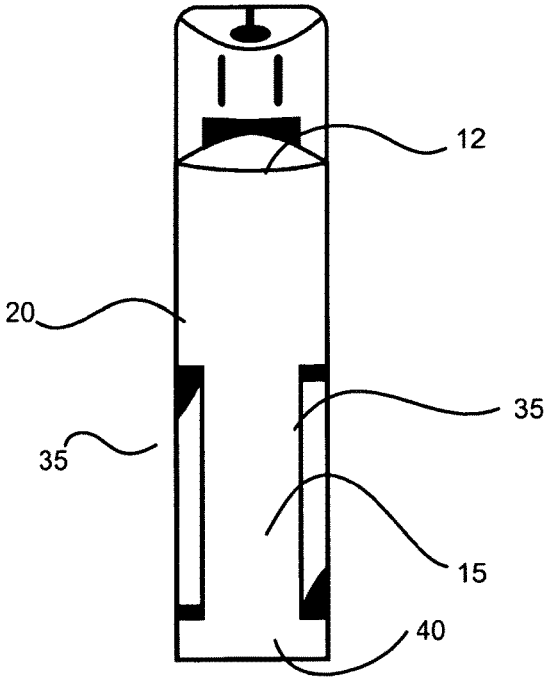
FIG. 11 is a side view of the apparatus for lighting and splitting a cigar in an inactive configuration.

The cigar splitter 15 has a passageway 55 configured to receive a cigar. The housing 50 has a top opening 60 and a bottom opening 65 that permit access to the passageway 55. A blade 70 is disposed on the [passageway] *inside* wall 58 and has a knife edge 75 oriented parallel to the axis of the housing 50, similar to as shown in FIGS. 6 and 11. The cigar splitter 15 is connected to the hinge 80 at a rim 85 of the top opening 65. The cigar splitter 15 is rotatable about the hinge 80. A cover 90 is connected to the rim 95 of the top opening 60 via a hinge 80. The cigar splitter 15 is configured to rotate between a locked orientation, for example shown in FIGS. 7, and an active orientation, for example shown in FIG. 8.

In the locked orientation, the cigar splitter frame housing's outside walls 52 are parallel to the wall [54] *56* of the lighter and the top 60 and bottom 65 openings are inaccessible to a user as the cover 90 is configured to block access to the bottom opening 65 when the cigar splitter 15 is in the locked orientation. The top opening 60 is blocked by the bottom of the frame of the lighter 12. The locked orientation serves to protect a user from accidentally injuring themselves on the blade 70. In the active orientation, the top 60 and bottom 65 openings are accessible for inserting a cigar (not shown) for splitting the cigar open along a long axis of the cigar, with the blade 70.

Figure 24:
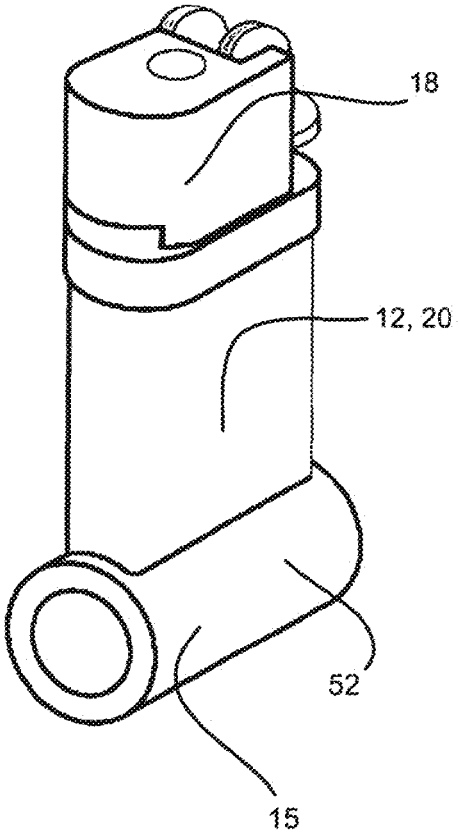
FIG. 24 is perspective view of a further variant of the apparatus for lighting and splitting a cigar.

In a further variant, referring to FIGS. 23 and 24, the lighter cigar splitter apparatus 10 comprises a lighter 12 and a cigar splitter 15. The lighter has a lighter head 18 and a frame 20. *The frame has a top 82, a base 84 and an outside surface 86 between the top and the base. The frame has a frame axis (not shown) parallel to the frame outside surface passing through the top and the base.* The cigar splitter 15 is disposed below the [lighter] frame 20 and connected to the frame 20 in a fixed position. The cigar splitter comprises a hollow housing 50 formed in *a* cylindrical shape.

The cigar splitter 15 has a passageway 55 configured to receive a cigar. The housing 50 has a top opening 60 and a bottom opening 65 that permit access to the passageway 55. A blade 70 is disposed on the [passageway] *inside* wall 58 and has a knife edge 75 oriented parallel to the axis of the housing 50, similar to as shown in FIG. 1. The bottom portion 40 of the lighter is configured to conform in corresponding shape to receive and abut the outer side wall 52 of the cigar splitter 15. The cigar splitter 15 is connected to the lighter frame 20 by the outside wall 52 of the cigar splitter 15.

Figure 25:
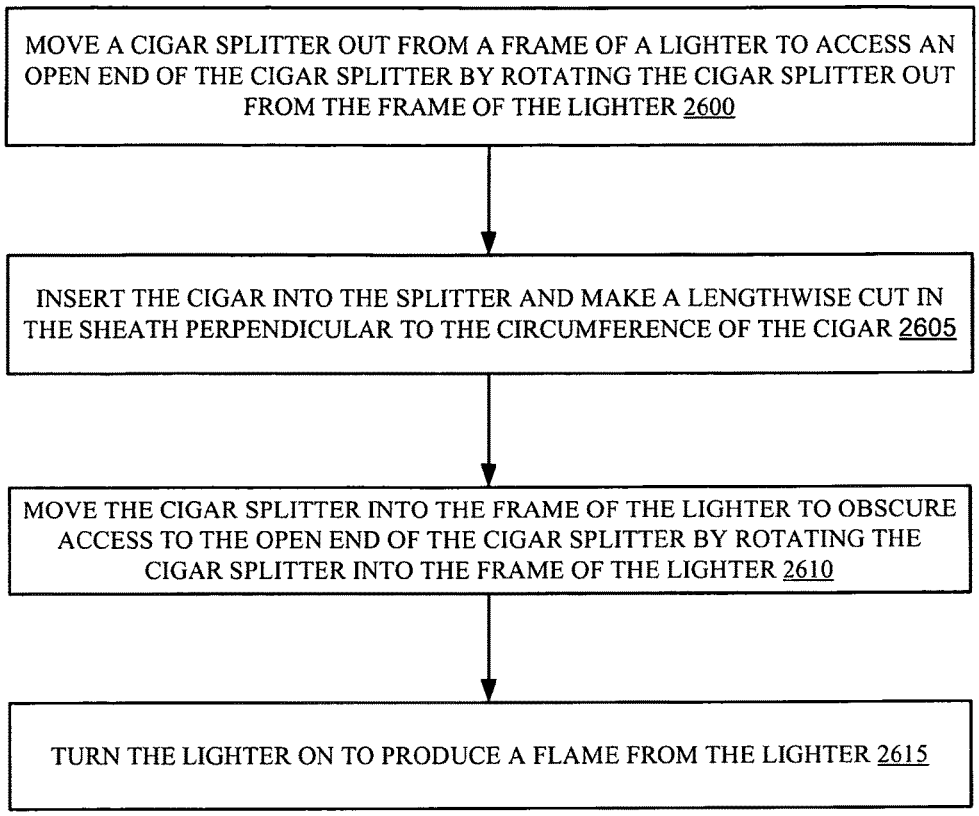
FIG. 25 is a flow chart illustrating a method for splitting a cigar and lighting the cigar.

In still another variant, referring to FIG. 25, a method of making a lengthwise 13 cut 4 in a sheath 6 of a cigar 8 perpendicular to the circumference 14 of the cigar 8, and lighting the cigar 8, comprises: in a step 2600, moving a cigar splitter out from a frame of a lighter to access an open end of the cigar splitter; in a step 2605 inserting a cigar into the splitter and making a lengthwise cut in the sheath perpendicular to the circumference of the cigar; in a step 2610 moving the cigar splitter into the frame of the lighter to obscure access to the open end of the cigar splitter; and in a step 2615 turning the lighter on to produce a flame from the lighter.

In yet a variant of the method, the step 2600 of moving the cigar splitter out from the frame of the lighter comprises rotating the cigar splitter out from the frame of the lighter to access the open end of the cigar splitter; and the step 2610 of moving the cigar splitter into the frame of the lighter comprises rotating the cigar splitter into the frame of the lighter to obscure access of the open end of the cigar splitter.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether CTRL logic or other components, can be combined in a single package or separately maintained and can further be distributed across multiple locations.

Additionally, the various embodiments set forth herein are described m terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

It is claimed:

1. An apparatus for opening up the sheath of a cigar and lighting the cigar, comprising:
- a lighter, comprising a lighter frame; and
- a cigar splitter attached to a base of the lighter frame by an outside surface of the cigar splitter, the cigar splitter comprising:
  - a housing having two open ends, an inside wall, and the outside surface, an axis parallel to the inside wall and passing through the two open ends, the two open ends permitting insertion of a cigar along the axis through one of the two open ends and to exit through another of the two open ends, and
  - a blade attached to the inside wall and oriented along the axis, the blade suitable for cutting an outer sheath of the cigar as the cigar is inserted through the cigar splitter along the axis.

2. The apparatus of claim 1 further wherein the cigar splitter further comprises a loop attached to the outside surface of the housing.

3. The apparatus of claim 2 wherein the loop is configured to receive a keychain.

4. The apparatus of claim 1 wherein the cigar splitter is disposed below the lighter frame and connected to the lighter frame in a fixed position.

5. The apparatus of claim 1 wherein the two open ends of the housing extend beyond the base of the lighter frame.

6. The apparatus of claim 1 wherein the two open ends of the housing are co-axial with the base of the lighter frame.

7. The apparatus of claim 1 wherein the cigar splitter and the base are formed together of a single material.

8. The apparatus of claim 1 wherein the axis extends through the cigar splitter and lighter frame.

9. The apparatus of claim 1 wherein the axis is perpendicular to a second axis extending from the base through the lighter frame.

10. A combination lighter and cigar splitter comprising:
- a lighter frame;
- a lighter head, including a mechanism for igniting the lighter; and
- a cigar splitter attached to a base of the lighter frame by an exterior surface of the cigar splitter, the cigar splitter comprising:
  - a housing having two open ends, an inside wall, and the exterior surface, an axis parallel to the inside wall and passing through the two open ends, the two open ends permitting insertion of a cigar along the axis through one of the two open ends and to exit through another of the two open ends, and
  - a blade attached to the inside wall and oriented along the axis, the blade suitable for cutting an outer sheath of the cigar as the cigar is inserted through the cigar splitter along the axis.

11. The combination lighter and cigar splitter of claim 8 further wherein the cigar splitter further comprises a loop attached to the exterior surface of the housing.

12. The combination lighter and cigar splitter of claim 10 wherein the loop is configured to receive a keychain.

13. The combination lighter and cigar splitter of claim 10 wherein the cigar splitter is disposed below the lighter frame and connected to the lighter frame in a fixed position.

14. The combination lighter and cigar splitter of claim 10 wherein the two open ends of the housing extend beyond the base of the lighter frame.

15. The combination lighter and cigar splitter of claim 10 wherein the two open ends of the housing are co-axial with the base of the lighter frame.

16. The combination lighter and cigar splitter of claim 10 wherein the cigar splitter and the base are formed together of a single material.

17. The combination lighter and cigar splitter of claim 10 wherein the axis extends through the cigar splitter and lighter frame.

18. The combination lighter and cigar splitter of claim 10 wherein the axis is perpendicular to a second axis extending from the base through the lighter frame.

*19. An apparatus for opening up the sheath of a cigar, said apparatus comprising:*

*a frame having a top, a base, a frame outside surface between said top and said base and a frame axis parallel to said frame outside surface passing through said top and said base;*

*a housing connected to said base in a fixed position;*

*said housing having two housing open ends, a housing inside wall, and a housing outside surface, an axis parallel to the housing inside wall and passing through the two housing open ends, the two housing open ends permitting insertion of a cigar along the axis through one of the two housing open ends and to exit through a second of the two housing open ends;*

*wherein said frame axis and said housing axis are perpendicular to each other; and*

*a blade attached to the housing inside wall and oriented along the housing axis, the blade for cutting an outer sheath of the cigar as the cigar is inserted through the housing along the housing axis.*

* * * * *